United States Patent
Hill

(10) Patent No.: US 6,636,217 B1
(45) Date of Patent: Oct. 21, 2003

(54) REGULARIZED TANGENTS IN COMPUTER GRAPHICS

(75) Inventor: Kenneth Jamieson Hill, Plymouth, MI (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/569,969

(22) Filed: May 11, 2000

(51) Int. Cl.⁷ .............................. G06T 11/20
(52) U.S. Cl. ............... 345/441; 345/440; 345/442; 345/443
(58) Field of Search .................. 345/441, 442, 345/440, 443

(56) References Cited

U.S. PATENT DOCUMENTS

| | | | |
|---|---|---|---|
| 4,958,305 A | 9/1990 | Piazza | 364/522 |
| 5,123,087 A | 6/1992 | Newell et al. | 395/155 |
| 5,185,855 A * | 2/1993 | Kato et al. | 345/441 |
| 5,572,639 A | 11/1996 | Gantt | 395/133 |
| 5,636,338 A * | 6/1997 | Moreton | 345/420 |
| 5,717,905 A * | 2/1998 | Iwamoto et al. | 345/442 |
| 6,072,502 A * | 6/2000 | Gupta | 345/442 |
| 6,108,011 A * | 8/2000 | Fowler | 345/441 |
| 6,278,445 B1 * | 8/2001 | Tanaka et al. | 345/177 |
| 6,304,677 B1 * | 10/2001 | Schuster | 345/442 |
| 6,373,491 B1 * | 4/2002 | Sasaki | 345/443 |

OTHER PUBLICATIONS

Foley, "Computer Graphics: Principles and Practice", second edition in C, Jul. 1997, pp. 478–488.*

* cited by examiner

Primary Examiner—Jeffery Brier
Assistant Examiner—Daniel J Chung
(74) Attorney, Agent, or Firm—Gates & Cooper LLP

(57) ABSTRACT

A method, apparatus and article of manufacture for generating regularized tangents of curves. The method comprises the steps of bounding a length of the arc, computing a chord vector, where the chord vector corresponds to the bounded length of the arc, generating a tangent vector, where the tangent vector is substantially normal to the chord vector, and regularizing the tangent vector, where the regularized tangent vector approximates a true tangent vector to the arc.

25 Claims, 10 Drawing Sheets

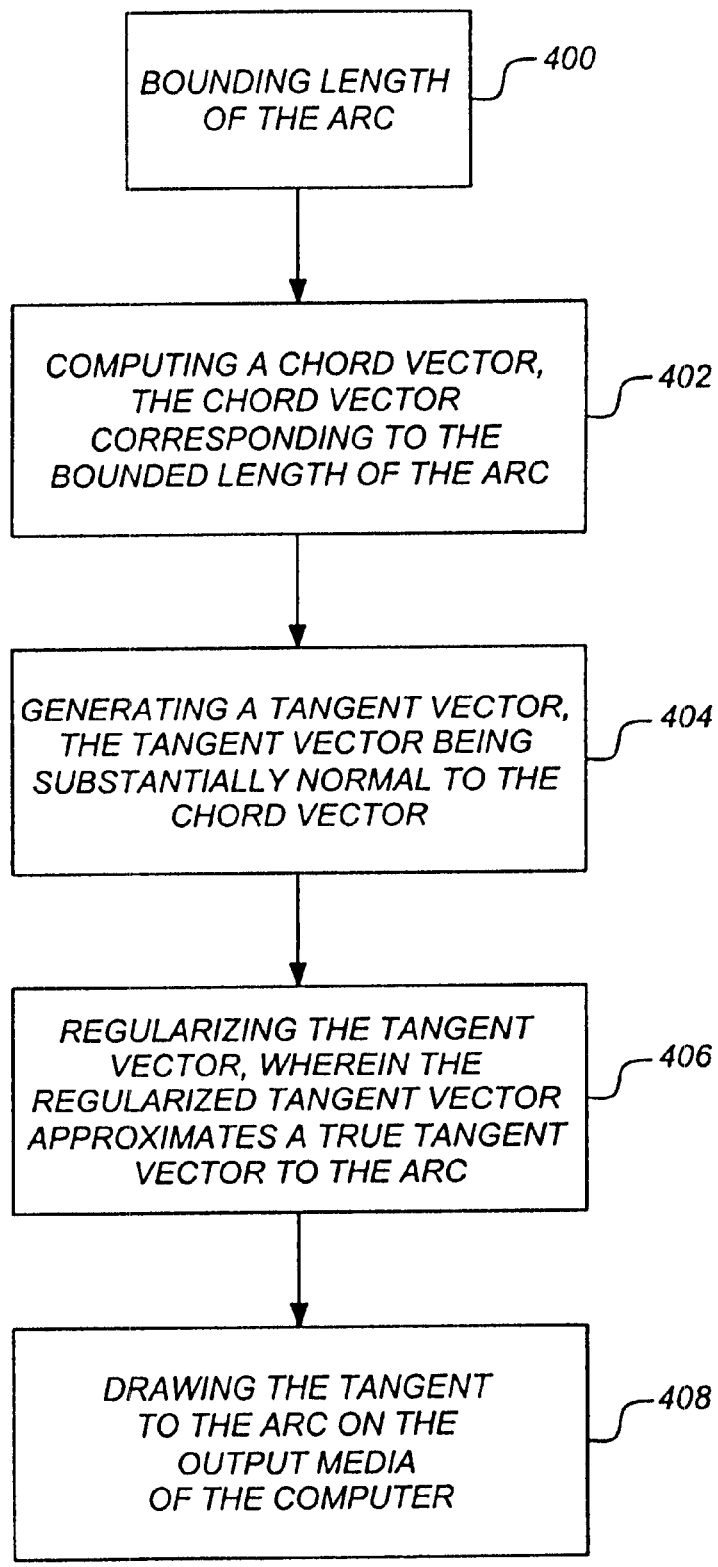

REGULARIZED TANGENTS IN COMPUTER GRAPHICS

BACKGROUND OF THE INVENTION

1. Field of the Invention

This invention relates in general to constraint based curve design, and more particularly, to a method, apparatus, and article of manufacture for generating regularized tangents of curves.

2. Description of Related Art

Lines, curves, arcs, and splines are used in 3D Computer Aided Design (CAD) systems and vector graphics systems to indicate surfaces, edges, and other geometric shapes.

Typically, magnitudes of tangents to splines, arcs, and curves are estimated by the user. This magnitude estimation at endpoints and/or midpoints on the curves lead to errors in computations based on the improperly estimated tangents, leading to wasted materials, time, and effort. The direction of a tangent is a geometric idea that a user is comfortable with in solving equations involving derivatives, which require direction and magnitude, but the magnitude has no geometric reference for the user.

Therefore, there is a need in the art for a way to generate tangents that is more intuitive. There is also a need in the art for a way to quickly generate tangents for an arc or curve. There is also a need in the art to be able to quickly generate tangents at endpoints of an arc or curve.

SUMMARY OF THE INVENTION

To overcome the limitations in the prior art described above, and to overcome other limitations that will become apparent upon reading and understanding the present specification, the present invention discloses a method, apparatus and article of manufacture for generating regularized tangents of curves. The method comprises the steps of bounding a length of the arc, computing a chord vector, where the chord vector corresponds to the bounded length of the arc, generating a tangent vector, where the tangent vector is substantially normal to the chord vector, and regularizing the tangent vector, where the regularized tangent vector approximates a true tangent vector to the arc.

An object of the present invention is to provide a method for generating tangents that is more precise. Another object of the present invention is to provide a method for quickly generating tangents for an arc or curve. Still another object of the present invention is to provide a method for quickly converting tangents to derivatives at endpoints of an arc or curve.

BRIEF DESCRIPTION OF THE DRAWINGS

FIG. 4 is a flowchart illustrating the steps used to practice one embodiment of the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention describes a method, apparatus, and article of manufacture for synthesizing derivative contstraints given ordered point constraints and associated regularized tangents of the present invention. The synthesis process converts the ordered point data and associated regularized tangent data to derivative constraints at the ordered points, and generates a curve that fits the ordered point data and derivative data. The present invention also allows a user to generate regularized tangents, given the derivative data and a set of ordered points. The user can also compute second derivative constraints if user specifies the curvature or the radius of curvature of the curve at one of the ordered points with associated regularized tangent data at that point.

Hardware Environment

Figure 1:
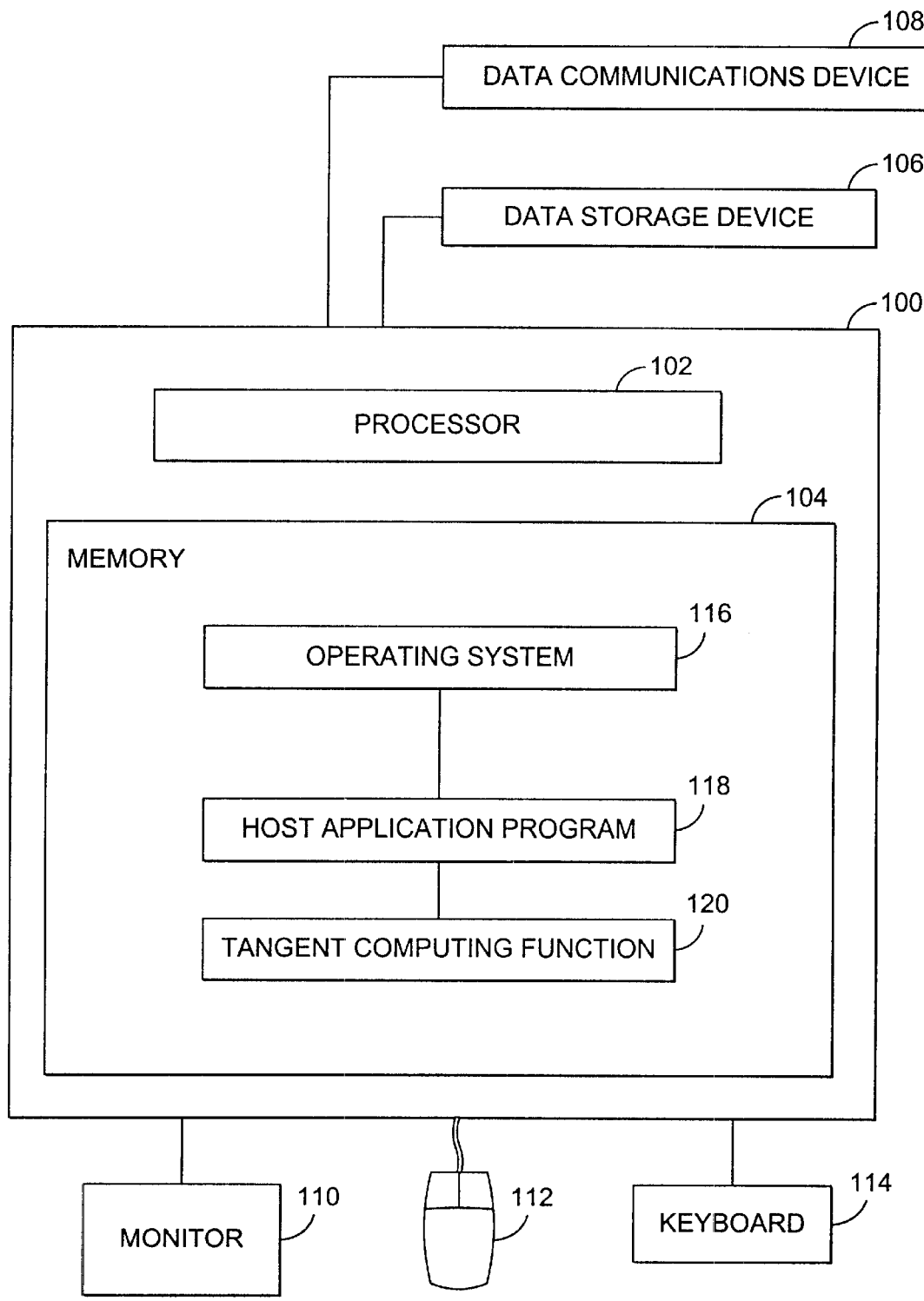
FIG. 1 illustrates an exemplary computer hardware environment that could be used with the present invention.

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, holographic display device, etc.), mouse pointing device 112 and keyboard 114. It is envisioned that attached to the personal computer 100 may be other devices such as read only memory (ROM), a video card, bus interface, printers, etc. Any combination of the above components, or any number of different components, peripherals, and other devices, may be used with the computer 100 without departing from the scope of the present invention. For purposes of clarity and completeness, references herein to monitor 110 encompass and include additional references to holographic display devices, goggles, and helmets as well as video monitors.

The personal computer 100 usually operates under the control of an operating system 116. The present invention is usually implemented in one or more computer programs 118 that operate under the control of the operating system 116. The computer program 118 is usually a CAD program or other graphics program. In the preferred embodiment, the computer program 118 includes a tangent computing function 120.

Generally, the computer program 118 and tangent computing function 120 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Many modifications may be made to this configuration without departing from the scope of the present invention. Further, the tangent computing function 120 can output the tangent to the monitor 110, a data storage device 106, the processor 102, or other output media connected to the computer 100.

The present invention also teaches that any combination of the above components, or any number of different components, including computer programs, peripherals, and other devices, may be used to implement the present invention, so long as similar functions are performed thereby. The presentation of the computer system as described in FIG. 1 is not meant to limit the scope of the present invention, but to illustrate one possible embodiment of the present invention.

Computing Derivative Constraints From Regularized Tangents

FIGS. 2A–2D illustrate the computation of tangents according to the present invention.

The magnitude of derivatives specified as constraints has little correlation for a user with any physical geometry. Ideally the magnitude chosen for the tangents input by the user would be independent of a scaling of parameters (curve parameterization), and if a curve is computed with only interpolating point constraints, and a tangent constraint with unit magnitude is added to match the current tangent of the curve at that point, then there should be a minimal change in the geometry of the curve after the new constraint is applied.

An arbitrary curve is typically defined by endpoints and one or more interpolating points that are connected by a spline. Each section of the curve has two endpoints. Lines, known as chords, can be drawn between any two endpoints. Each chord is then used to make approximations and perform calculations about the section, or arc, of the curve associated with that chord.

For a continuous curve with continuous first derivatives, the magnitude of the derivative vector of the curve with respect to a given point on the curve, namely tau ($\tau$), is given by $$\left|\frac{dC}{d\tau}\right| = \frac{ds}{d\tau} = \sqrt{\left(\frac{\partial x}{\partial t}\right)^2 + \left(\frac{\partial y}{\partial t}\right)^2 + \left(\frac{\partial z}{\partial t}\right)^2}$$

where ds/dt is the change in arc length (s) with respect to the parameter ($\tau$).

To estimate the value of ds/dt, $$\left|\frac{dC}{d\tau}\right|(\tau_0)$$

is $$\frac{S(\tau_0, \tau_1)}{\tau_1 - \tau_0}$$

where $s(\tau_0, \tau_1)$ is the arc length of the curve between $\tau_0$ and $\tau_1$, and where the estimate is exact as $\tau_1$ approaches $\tau_0$.

However, the derivative is required to construct the curve, which means that there is no arc length to measure. Thus, the arc length must be estimated. The arc length estimation can be bounded by three heuristic factors. First, for a shallow arc, the arc length can be estimated to be the length of a straight line. Second, for an arc with large curvature, the arc length approaches the length of half of a circle with the chord as the diameter of the circle. Third, for an opposing vector, the vector magnitude can be estimated at 1.5 times the vector length.

Regularized Tangent Calculations

Figure 2A:
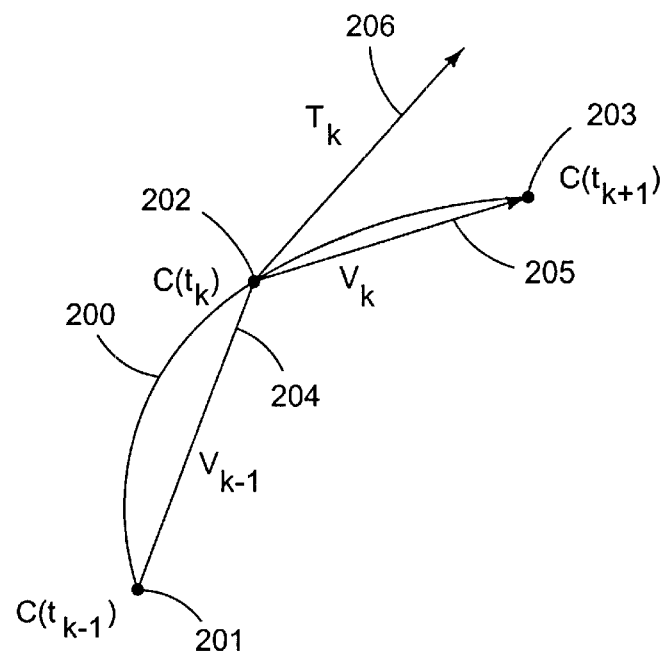
FIGS. 2A–2D illustrate the computation of tangents according to the present invention.

FIG. 2A illustrates the general scenario for determining regularized tangents as provided in the present invention. In the general case where the tangent point lies on a midpoint on a curve 200 with endpoint $C(t_{k-1})$ 201, point $C(t_k)$ 202, and endpoint $C(t_{k+1})$ 203, chord vectors $V_{k-1}$ 204 and $V_k$ 205 are generated. Tangent vector $T_k$ 206 at point $C(t_k)$ 202 is also shown.

An approximation of the magnitude of chord vectors $V_{k-1}$ 204 and $V_k$ 205 is given by:

$$v_i = C(t_{i+1}) - C(t_i)$$

The scale factor $\sigma_k$, used to properly size the tangent vector of the curve $T_k$ 206, is given as follows. For each point 202, where a constraint tangent is to be calculated, that lies on the curve 200 and not at an endpoint 201 or 203, there are two scale factors to determine, $\sigma^+$ and $\sigma^-$ where $\sigma^+$ is the scale factor for vector $V_k$ 205 and where $\sigma^-$ is the scale factor for vector $V_{k-1}$ 204:

$$\sigma_k^+ = \alpha V_k \cdot \frac{T_k}{|T_k|} + \beta |V_k|$$

$$\sigma_k^- = \alpha V_{k-1} \cdot \frac{T_k}{|T_k|} + \beta |V_{k-1}|$$

Alpha ($\alpha$) and beta ($\beta$) are weighting factors and are typically −0.5 and 1.5, respectively, but can be other values. The reasons or motivations for calculating $\sigma^+$ and $\sigma^-$ are further described in the following section, when dealing with regularized tangents at endpoints of the curve.

To determine $\sigma_k$, a weighted average of $\sigma^+$ and $\sigma^-$ is typically used, for example:

$$\sigma_k = \frac{\Delta t_{k-1} \sigma_k^- + \Delta t_k \sigma_k^+}{\Delta t_{k-1} + \Delta t_k}$$

$$\sigma_k = \frac{|V_{k-1}| \sigma_k^- + |V_k| \sigma_k^+}{|V_{k-1}| + |V_k|}$$

$$\sigma_k = \frac{\sigma_k^- + \sigma_k^+}{2}$$

Other weighted averages may be used without departing from the scope of the present invention.

To determine the magnitude of the vector $T_k$ 206, the following is used:

$$\frac{dC}{dt}(t_k) = \sigma_k T_k$$

The above determination is also invertable, e.g., if the derivative is known, then the vector direction can be determined as follows:

$$T_k = \frac{1}{\sigma_k} \frac{dC}{d\tau}(t_k)$$

Specific Regularized Tangents at Endpoints of the Curve

In the range 0 to $\pi/2$ the arc length of a circular arc starts and ends on the chord end points and has the correct tangent vector. The present invention calculates $\sigma$, the arc length estimation function, which depends on the dot product between the chord and the tangent vector to determine an appropriate scale.

A two-dimensional rotation matrix is as follows:

$$Rot\theta = \begin{pmatrix} \cos\theta & -\sin\theta \\ \sin\theta & \cos\theta \end{pmatrix}$$

where $\theta$ is the angle between vectors. A unitized chord vector in the x-direction, v, is given by:

$$v = \begin{pmatrix} 1 \\ 0 \end{pmatrix}$$

and a unit tangent vector t is a function (dot product) of an angle from v, the unitized chord vector:

$$t(\phi) = Rot(\theta) \cdot \begin{pmatrix} 1 \\ 0 \end{pmatrix}$$

The absolute value of the sin of the angle between two unitized vectors $v_1$ and $v_2$ is determined by:

$$Det(v_1, v_2) = Abs(v_1[1]*v_2[2] - v_1[2]*v_2[1])$$

The length s of a circle arc with a unit maximum chord length and tangent angle $\theta$ to the chord is given by:

$$s(\theta) = \arcsin[absDet(t[\theta], v)]/absDet(t[\theta], v)$$

Figure 2B:
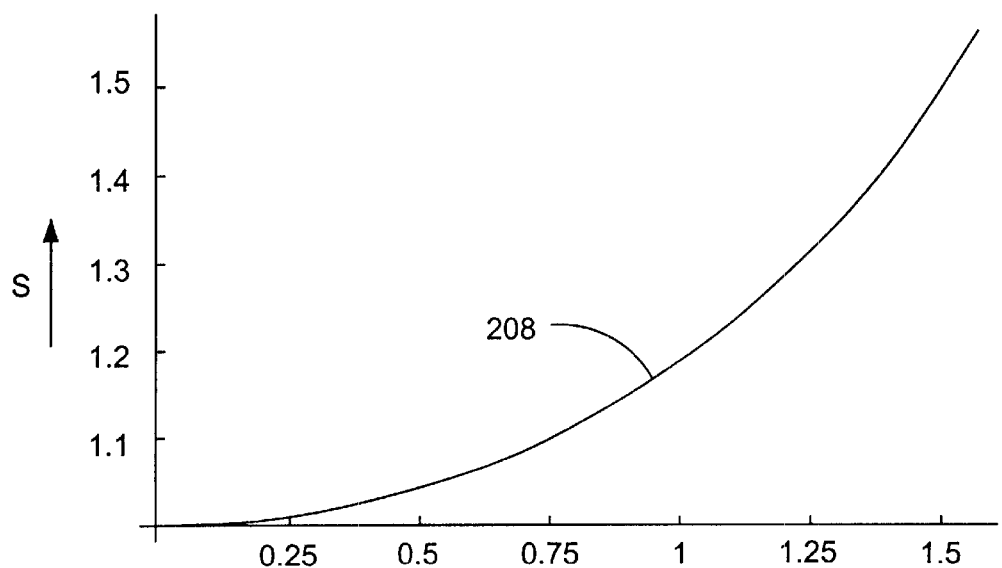

A plot of $s(\theta)$ 208 over 0 to $\pi/2$ is shown in FIG. 2B.

The plot of $s(\theta)$ 208 shows us the relationship between two vectors. The cosine of the angle between those two vectors yields the scale factor $\sigma$, as a function of the dot product of the vectors c, for the vectors to properly size the tangent vector of the curve:

$$\sigma_0(c) = s[\arccos[c]]$$

Figure 2C:
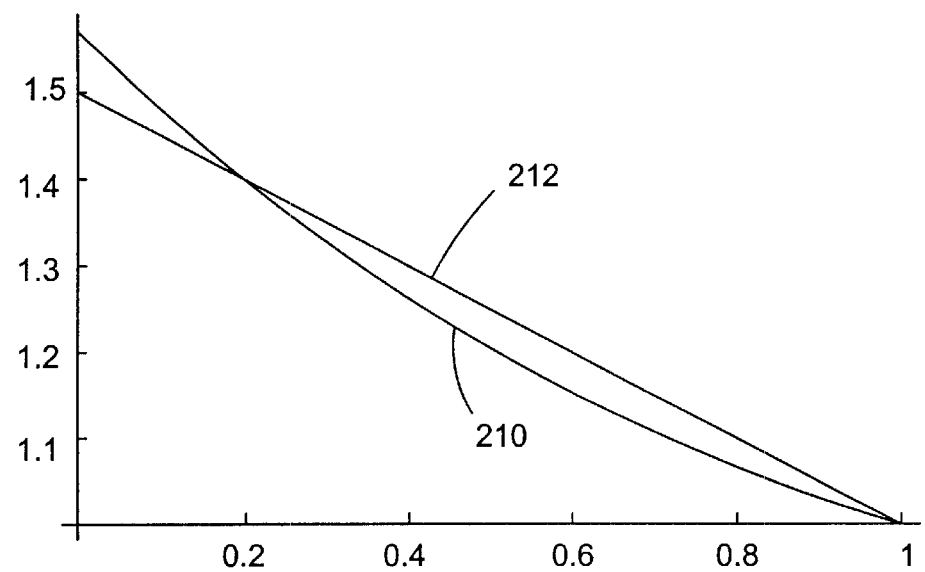

FIG. 2C shows a plot of $\sigma_0$ 210 on a graph with the line 212 $y = -c/2 + 3/2$. FIG. 2C illustrates that $\sigma_0$ 210 is nearly linear, which suggests that a reasonable choice for a scale factor is $$\sigma(c) = -0.5c + 1.5$$

The term 1.5 is called the "bias" and may be set to other values as desired.

If the chord and tangent vector lengths are not 1.0, $\sigma$ must be generalized as follows:

$$\sigma(v, t) = -0.5 \frac{v \cdot t}{\sqrt{t \cdot t}} + 1.5 \sqrt{v \cdot v}$$

Expressed in this fashion $\sigma$ is scaled by the length of the chord v, which is done because arc length scales linearly; as the chord grows, the arc length grows at the same rate.

If t is a unit tangent vector at $\tau_0$, and v is the chord with endpoints $C\tau_0$ and $C\tau_1$, then a reasonable choice of the derivative $C'(\tau_0)$ is $$\frac{dC}{dt}(\tau_0) = \frac{|\vec{v}|\sigma\left(\frac{\vec{t} - \vec{v}}{|\vec{v}|}\right)}{\tau_1 - \tau_0} \vec{t}$$

The vector t is then called the regularized tangent vector. If t is specified with unit length 2, then the effect on the curve is that the tangent vector will overlap or "hug" the curve twice as much as if t had a unit length of 1.

Figure 2D:
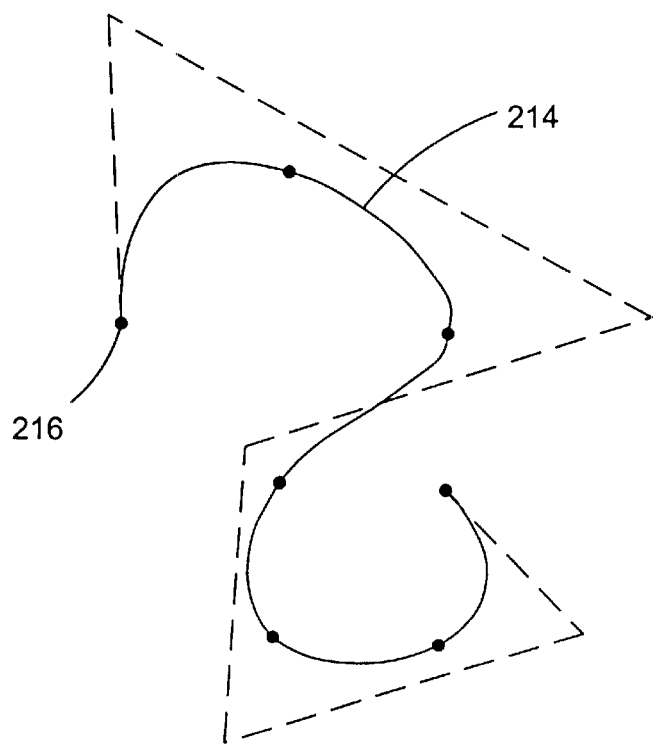

FIG. 2D illustrates a spline curve 214 fit through seven points using standard fitting techniques.

The derivative at point 216 is determined using the above equations and has a direction (−1.06076, 16.1576) and magnitude 16.1924. The regularized tangent vector t in the direction of the end derivative has a direction (−0.0655094, 0.997852). The chord vector between the first two points on the curve is (1,1). Using the regularized tangent vector, the estimate for the magnitude of the derivative at point 216 is $\sigma = 12.9271$.

Generating the Regularized Tangent

Figure 3A:
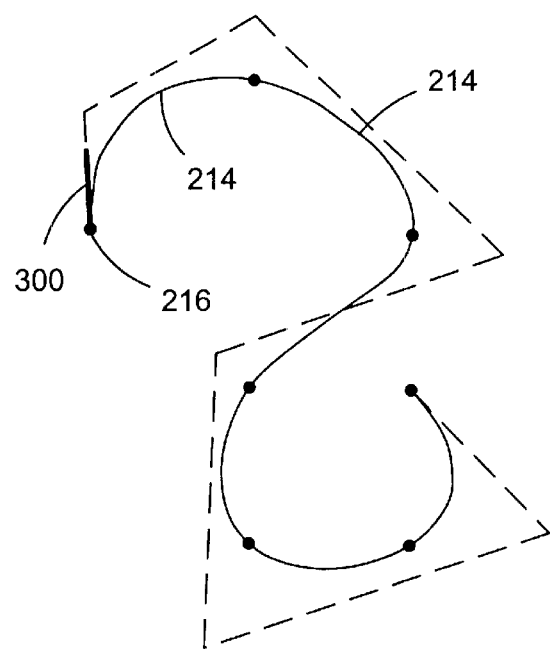
FIG. 3A illustrates a tangent generated for the curve using the estimating function of the present invention.
Figure 3B:
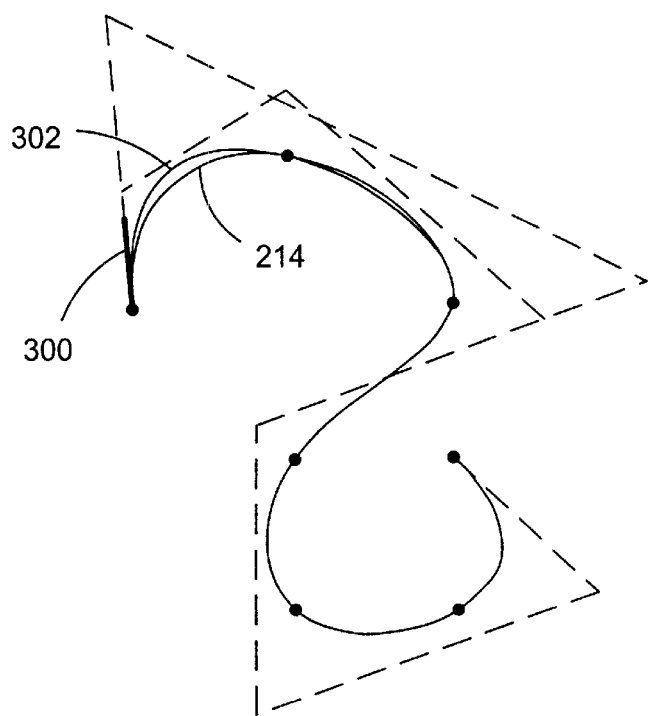
FIG. 3B illustrates a new curve generated using the tangent generated by the present invention.

FIG. 3A illustrates a tangent generated for the curve using the estimating function of the present invention. Using the estimation function $\sigma$ of the present invention, tangent 300 is shown at endpoint 216 of curve 214. FIG. 3B illustrates a new curve 302 generated using the tangent 300. Curve 302 closely tracks curve 214, but, because of the estimation of the derivative, curve 302 does not exactly align with curve 214. However, the curves 214 and 302 track within a few percent throughout the lengths of curves 214 and 302.

Figure 3C:
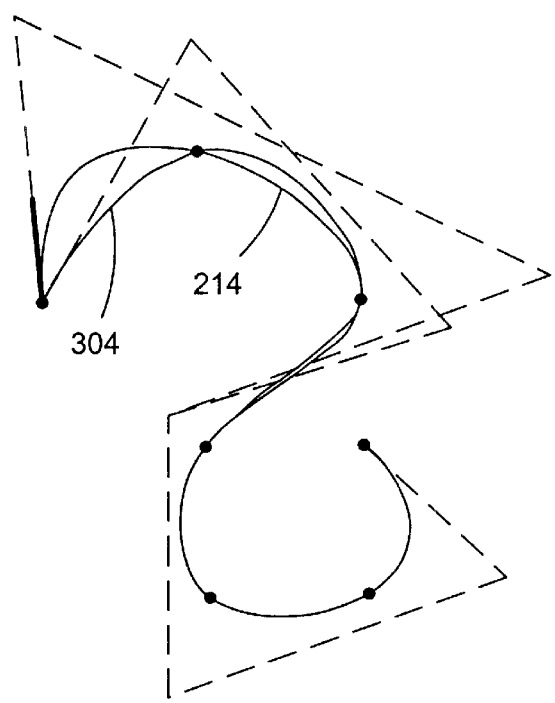
FIGS. 3G–3K illustrate various curves generated by regularized tangents incremented at 45 degrees without a tangent specified by the estimation function of the present invention.
Figure 3D:
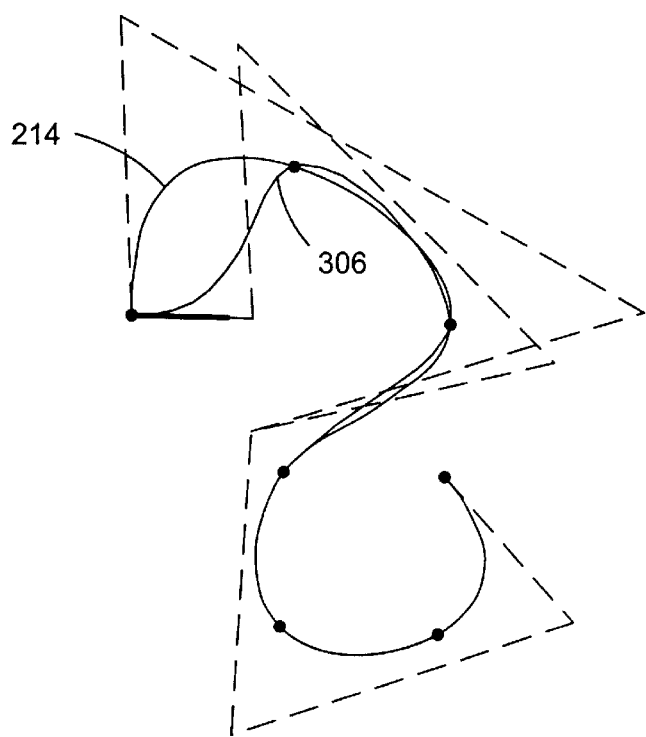
Figure 3E:
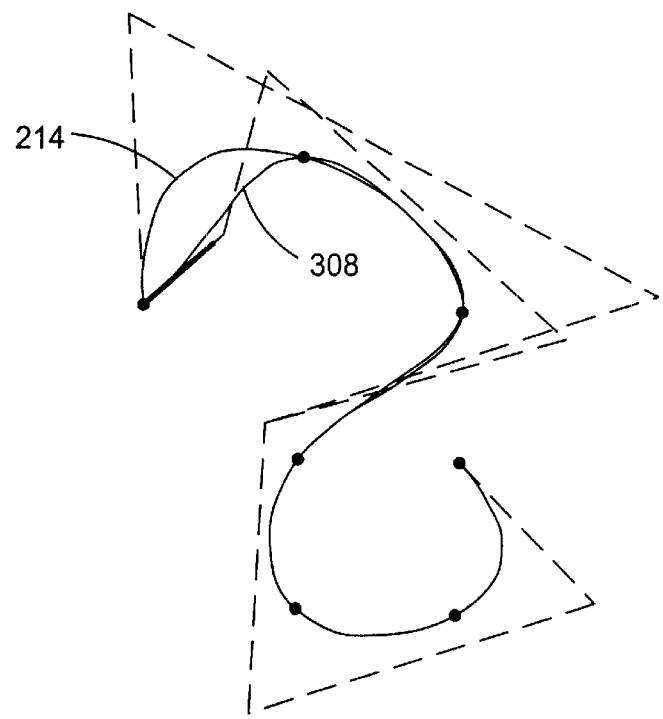
Figure 3F:
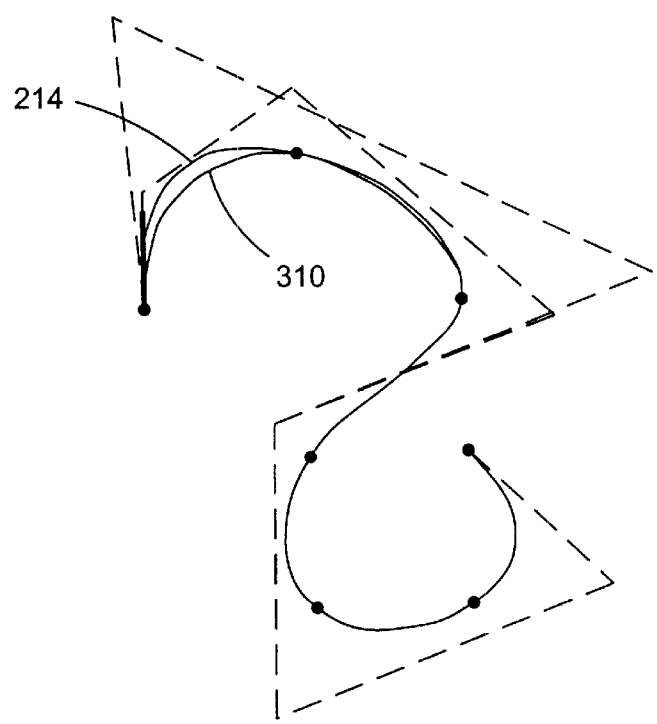
Figure 3G:
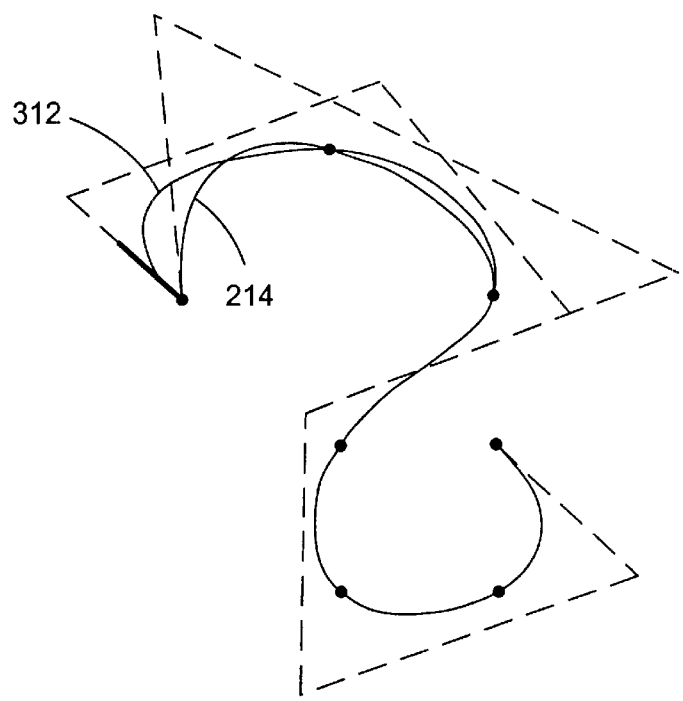
Figure 3H:
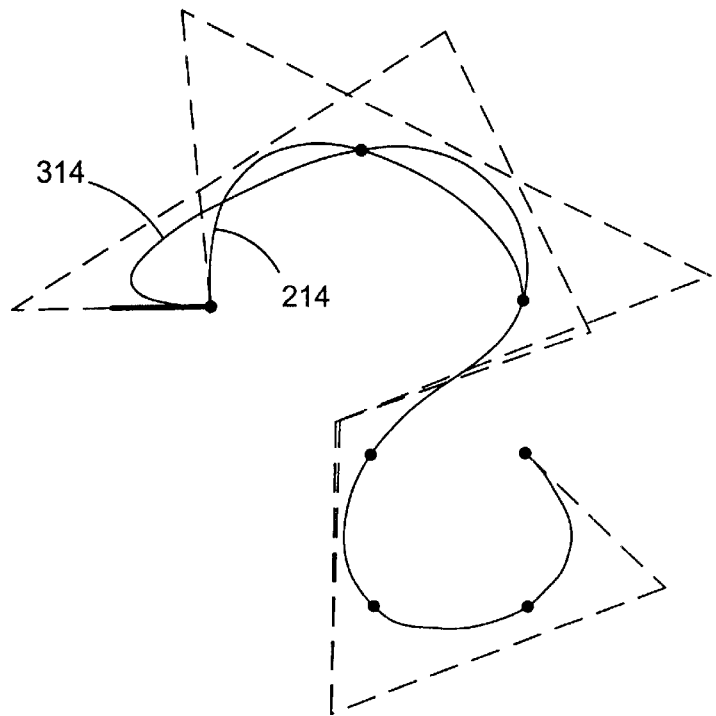
Figure 3I:
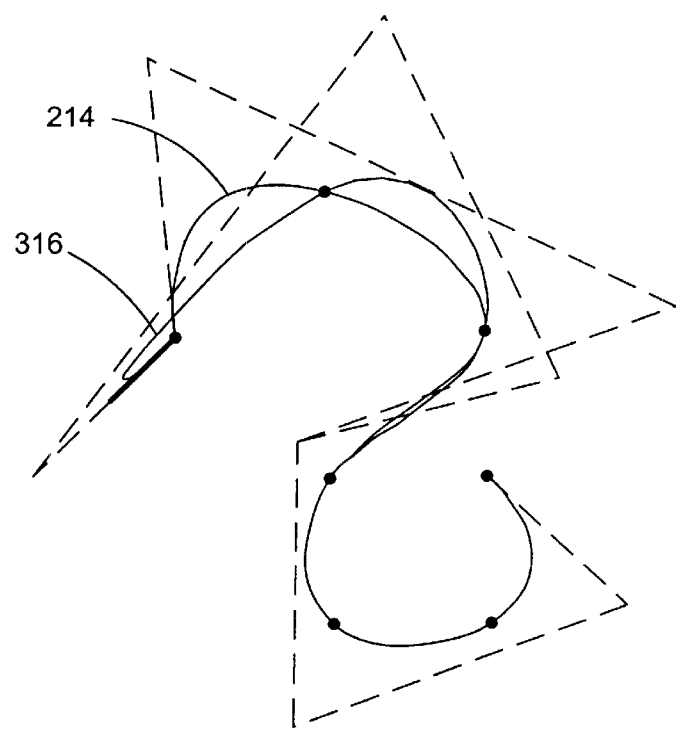
Figure 3J:
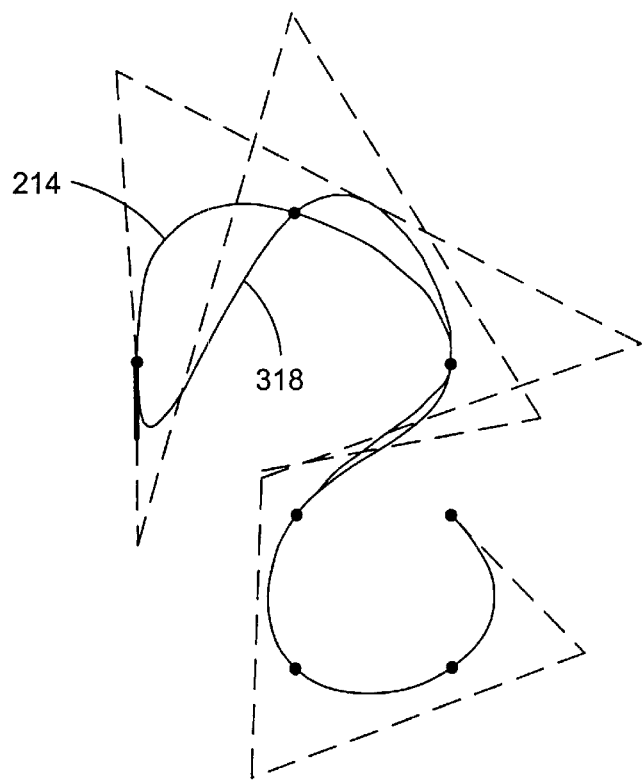
Figure 3K:
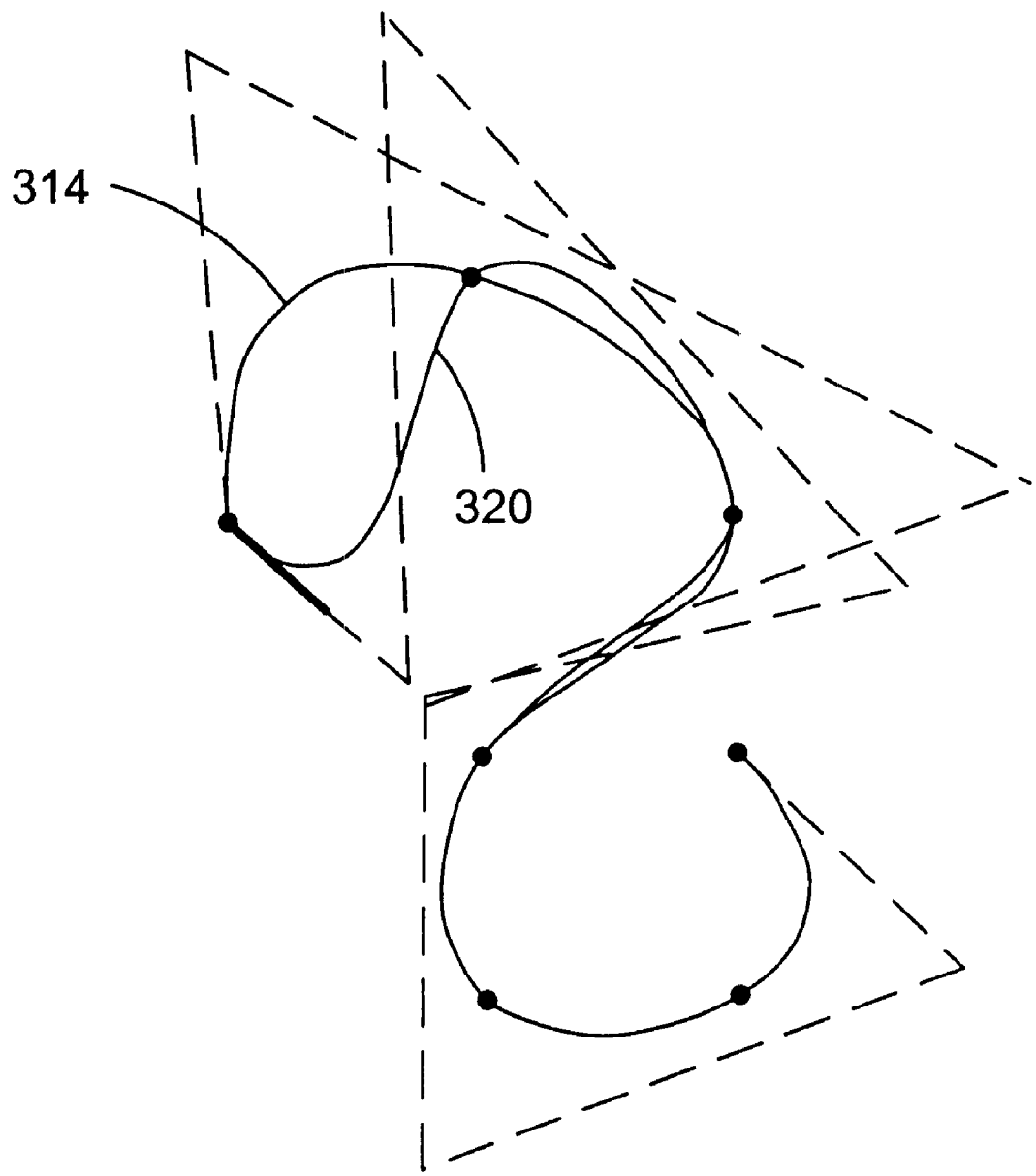

FIGS. 3G–3K illustrate various curves generated by regularized tangents incremented at 45 degrees without a tangent specified by the estimation function of the present invention. FIG. 3C illustrates curve 304, which begins to deviate from curve 214 in a more pronounced manner than curve 302. Curves 306 and 308 also deviate substantially from curve 214. Curve 310, shown in FIG. 3F, is the same as curve 302. Curves 312, 314, 316, 318, and 320 also deviate in rather dramatic fashion from the original curve 214. As such, the advantages of estimating the arc length and derivatives as done in the present invention become apparent.

Process Chart

FIG. 4 is a flowchart illustrating the steps used to practice one embodiment of the present invention.

Block 400 illustrates performing the step of bounding a length of the arc.

Block 402 illustrates performing the step of computing a chord vector, the chord vector corresponding to the bounded length of the arc.

Block 404 illustrates performing the step of generating a tangent vector, the tangent vector being substantially normal to the chord vector.

Block 406 illustrates performing the step of regularizing the tangent vector, wherein the regularized tangent vector approximates a true tangent vector to the arc.

Block 408 illustrates performing the step of drawing the tangent to the arc on the output media of the computer.

Conclusion

This concludes the description of the preferred embodiment of the invention. In summary, the present invention discloses a method, apparatus and article of manufacture for generating regularized tangents of curves. The method comprises the steps of bounding a length of the arc, computing a chord vector, where the chord vector corresponds to the bounded length of the arc, generating a tangent vector, where the tangent vector is substantially normal to the chord vector, and regularizing the tangent vector, where the regularized tangent vector approximates a true tangent vector to the arc.

The following describe some alternative ways of accomplishing the present invention. For example, different computer programs, operating environments, and operating systems can be substituted for those described herein. In addition, the present invention can use any type of computer, and need not be limited to a personal computer. The present invention can also use any type of graphics system, and need not be limited to the example described herein. Further, alternate approaches could be substituted for the logic described herein without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for generating a tangent to an arc in an output media of a computer, comprising the steps of:
    (a) obtaining two or more points to be utilized to define an arbitrary curve;
    (b) producing a spline that passes through the two or more points;
    (c) selecting one of the points in the curve;
    (d) generating a tangent vector at the selected point that defines a direction and magnitude for an arc passing through the selected point
    (e) computing a scaling factor based on an estimated arc length of the arc;
    (f) converting the tangent vector into a derivative for use in constructing the arc using the scaling factor; and
    (g) drawing the tangent to the arc on the output media of the computer.

2. The method of claim 1, further comprising the step of biasing a length of the tangent vector.

3. The method of claim 1, wherein the tangent vector is unitized.

4. An apparatus for generating a tangent to an arc for display on a computer, the apparatus comprising:
    (a) a computer;
    (b) means, performed by the computer, for obtaining two or more points to be utilized to define an arbitrary curve;
    (c) means, performed by the computer, for producing a spline that passes through the two or more points;
    (d) means, performed by the computer, for selecting one of the points in the curve;
    (e) means, performed by the computer, for generating a tangent vector at the selected point that defines a direction and magnitude for an arc passing through the selected point;
    (f) means, performed by the computer, for computing a scaling factor based on an estimated arc length of the arc;
    (g) means, performed by the computer, for converting the tangent vector into a derivative for use in constructing the arc using the scaling factor; and
    (h) means, performed by the computer, for drawing the tangent to the arc on an output media of the computer.

5. A program storage device, readable by a computer, tangibly embodying one or more programs of instructions executable by the computer to perform method steps of generating a tangent to an arc for display on a computer, comprising the steps of:
    (a) obtaining two or more points to be utilized to define an arbitrary curve;
    (b) producing a spline that passes through the two or more points;
    (c) selecting one of the points in the curve;
    (d) generating a tangent vector at the selected point that defines a direction and magnitude for an arc passing through the selected point
    (e) computing a scaling factor based on an estimated arc length of the arc;
    (f) converting the tangent vector into a derivative for use in constructing the arc using the scaling factor; and
    (g) drawing the tangent to the arc on the output media of the computer.

6. The method of claim 1 wherein the scaling factor ($\sigma_k$) is computed based on a chord vector ($V_k$) and the tangent vector ($T_k$) in accordance with:

$$\sigma_k = \alpha V_k \cdot \frac{T_k}{|T_k|} + \beta |V_k|.$$

7. The method of claim 6 wherein the chord vector is a leading chord vector to the selected point.

8. The method of claim 6 wherein the chord vector is a trailing chord vector from the selected point.

9. The method of claim 6 wherein the scaling factor is computed based on a weighted average of a leading chord vector and trailing chord vector.

10. The method of claim 1 further comprising constructing a second tangent vector ($T_k$) at a second selected point ($t_k$) based on a second derivative $$\left(\frac{dC}{dt}\right)$$

and the scaling factor ($\sigma_k$) in accordance with:

$$T_k = \frac{1}{\sigma_k} \frac{dC}{dt}(t_k).$$

11. The method of claim 1 wherein the tangent vector is converted by multiplying the scaling factor and the tangent vector.

12. The apparatus of claim 4, wherein the tangent vector is unitized.

13. The apparatus of claim 4 wherein the scaling factor ($\sigma_k$) is computed based on a chord vector ($V_k$) and the tangent vector ($T_k$) in accordance with:

$$\sigma_k = \alpha V_k \cdot \frac{T_k}{|T_k|} + \beta |V_k|.$$

14. The apparatus of claim 13 wherein the chord vector is a leading chord vector to the selected point.

15. The apparatus of claim 13 wherein the chord vector is a trailing chord vector from the selected point.

16. The apparatus of claim 13 wherein the scaling factor is computed based on a weighted average of a leading chord vector and trailing chord vector.

17. The apparatus of claim 4 further comprising means, performed by the computer, for constructing a second tangent vector ($T_k$) at a second selected point ($t_k$) based on a second derivative $$\left(\frac{dC}{dt}\right)$$

and the scaling factor ($\sigma_k$) in accordance with:

$$T_k = \frac{1}{\sigma_k}\frac{dC}{dt}(t_k).$$

18. The apparatus of claim 4 wherein the tangent vector is converted by multiplying the scaling factor and the tangent vector.

19. The program storage device of claim 5, wherein the tangent vector is unitized.

20. The program storage device of claim 5 wherein the scaling factor ($\sigma_k$) is computed based on a chord vector ($V_k$) and the tangent vector ($T_k$) in accordance with:

$$\sigma_k = \alpha V_k \cdot \frac{T_k}{|T_k|} + \beta|V_k|.$$

21. The program storage device of claim 20 wherein the chord vector is a leading chord vector to the selected point 22. The program storage device of claim 20 wherein the chord vector is a trailing chord vector from the selected point.

23. The program storage device of claim 20 wherein the scaling factor is computed based on a weighted average of a leading chord vector and trailing chord vector.

24. The program storage device of claim 5 further comprising constructing a second tangent vector ($T_k$) at a second selected point ($t_k$) based on a second derivative $$\left(\frac{dC}{dt}\right)$$

and the scaling factor ($\sigma_k$) in accordance with:

$$T_k = \frac{1}{\sigma_k}\frac{dC}{dt}(t_k).$$

25. The program storage device of claim 5 wherein the tangent vector is converted by multiplying the scaling factor and the tangent vector.

* * * * *